US009830640B2

(12) United States Patent
Ogrinz et al.

(10) Patent No.: US 9,830,640 B2
(45) Date of Patent: Nov. 28, 2017

(54) UNIFIED PRODUCT CATALOG ORDERS

(71) Applicant: Bank of America Corporation, Charlotte, NC (US)

(72) Inventors: Michael Emil Ogrinz, Easton, CT (US); Jennifer Elizabeth Munro, Matthews, NC (US); David Ryan Ammons, Lowell, NC (US)

(73) Assignee: Bank of America Corporation, Charlotte, NC (US)

( * ) Notice: Subject to any disclaimer, the term of this patent is extended or adjusted under 35 U.S.C. 154(b) by 872 days.

(21) Appl. No.: 14/248,002

(22) Filed: Apr. 8, 2014

(65) Prior Publication Data

US 2015/0287124 A1 Oct. 8, 2015

(51) Int. Cl.
*G06Q 30/00* (2012.01)
*G06Q 30/06* (2012.01)

(52) U.S. Cl.
CPC .............................. *G06Q 30/0635* (2013.01)

(58) Field of Classification Search
CPC .................................. G06Q 30/0601–30/0645
USPC ................................................ 705/26.1–27.2
See application file for complete search history.

(56) References Cited

U.S. PATENT DOCUMENTS

| | | | |
|---|---|---|---|
| 7,013,290 B2 | 3/2006 | Ananian | |
| 7,818,399 B1 | 10/2010 | Ross, Jr. et al. | |
| 8,315,919 B1 | 11/2012 | Perrochon | |
| 8,438,052 B1 | 5/2013 | Chanda et al. | |
| 8,527,369 B1 | 9/2013 | Yalamanchi et al. | |
| 2001/0007099 A1* | 7/2001 | Rau | G06Q 30/02 705/26.8 |
| 2003/0023507 A1 | 1/2003 | Jankelewitz | |
| 2003/0182101 A1 | 9/2003 | Lambert | |
| 2003/0212502 A1 | 11/2003 | Rojas et al. | |
| 2003/0212602 A1 | 11/2003 | Schaller | |
| 2003/0236791 A1 | 12/2003 | Wilmsen et al. | |
| 2004/0088411 A1 | 5/2004 | Jakubowski et al. | |
| 2005/0102192 A1 | 5/2005 | Gerrits et al. | |
| 2006/0173751 A1* | 8/2006 | Schwarze | G06Q 30/0603 705/26.61 |
| 2007/0192298 A1 | 8/2007 | Michalke et al. | |
| 2007/0260526 A1 | 11/2007 | Bartel | |
| 2007/0282882 A1* | 12/2007 | Agarwal | G06Q 30/0603 |
| 2008/0027830 A1 | 1/2008 | Johnson et al. | |
| 2008/0082479 A1 | 4/2008 | Chang et al. | |
| 2008/0109327 A1 | 5/2008 | Mayle et al. | |
| 2008/0167969 A1 | 7/2008 | Ofer et al. | |
| 2010/0030653 A1 | 2/2010 | Westphal | |

(Continued)

OTHER PUBLICATIONS

Baron, J. et al., Web-based e-catalog systems in B2B procurement. Communications of the ACM, 43, 5 (2000), 93-100.

*Primary Examiner* — Brandy A Zukanovich
*Assistant Examiner* — Arielle Weiner
(74) *Attorney, Agent, or Firm* — Michael A. Springs; Moore and Van Allen PLLC; Peter B. Stewart

(57) ABSTRACT

Embodiments for creating a unified catalog include systems and method that import catalog data from one or more underlying catalog systems. The systems configure required fields for order fulfillment and receive a request for at least one selected item from the user. The systems further present at least one required field to the user in response to the request and send an order for the at least one selected item to the one or more catalog systems, the order comprising data from the at least one required field.

17 Claims, 12 Drawing Sheets

(56) References Cited

U.S. PATENT DOCUMENTS

| | | |
|---|---|---|
| 2010/0191741 A1 | 7/2010 | Stefik et al. |
| 2011/0142335 A1 | 6/2011 | Ghanem et al. |
| 2011/0258083 A1* | 10/2011 | Ren .................. G06Q 10/087 |
| | | 705/27.1 |
| 2011/0268083 A1 | 11/2011 | Ostrup et al. |
| 2012/0209735 A1* | 8/2012 | Subramanian .......... H04L 9/321 |
| | | 705/26.1 |
| 2014/0095971 A1* | 4/2014 | Gowen ................. G06F 3/0484 |
| | | 715/226 |
| 2015/0286988 A1* | 10/2015 | Ogrinz ................... G06Q 10/10 |
| | | 705/345 |
| 2015/0287111 A1* | 10/2015 | Ogrinz ............... G06Q 30/0603 |
| | | 705/26.2 |

* cited by examiner

FIG. 5

| Synonyms: | | | 610 |
| --- | --- | --- | --- |
| ID | Catalog item | | Value |
| X ▼ No filter applied | | | |
| X | Item 1 | | mobile |
| X | Item 2 | | mobile 1 |
| XXXXX | Item 3 | | work@home |
| XXXXX | Item 4 | | media |
| XXXXX | Item 5 | | Software 1 |
| XXXXX | Item 6 | | Software 1 |
| XXXXX | Item 7 | | Software 1 |
| XXXXX | Item 8 | | Software 1 |
| XXXXX | Item 9 | | Software 1 |
| XXXXX | Item 10 | | Software 1 |
| XXXXX | Item 11 | | Software 2 |
| XXXXX | Item 12 | | phone |
| XXXXX | Item 13 | | Software 2 |
| XXXXX | Item 14 | | Software 2 |
| XXXXX | Item 15 | | Software 2 |

1-50 of 169 items  10 | 50 | 500 | 2000 | All

| ID | XXXXX |
| --- | --- |
| Catalog item | Item 6 |
| Value | Software 1 |

| Save | Delete | Clear | Export |

*FIG. 6*

| Source Category | | |
|---|---|---|
| ID | ↑ Product Category | Source Category Name |
| X | Application Services | Application Services\|Connectivity\|Data Transmission |
| X | Application Services | Application Services\|Connectivity\|Network Services |
| X | Application Services | Application Services\|Connectivity\|Support |
| X | Application Services | Application Services\|Distribution Servers\|HOSTING SERVICES\|Compute Hosting Platform |
| X | Application Services | Application Services\|Distribution Servers\|HOSTING SERVICES\|Dedicated |
| X | Application Services | Application Services\|Distribution Servers\|HOSTING SERVICES\|Grid Computing |
| X | Application Services | Application Services\|Distribution Servers\|HOSTING SERVICES\|Proprietary |
| X | Application Services | Application Services\|Distribution Servers\|HOSTING SERVICES\|Utility Compute |
| X | Application Services | Application Services\|Global Security Services |
| XX | Application Services | Application Services\|Global Security Services\|Traffic Management |
| XX | Application Services | Application Services\|Linux on System Server Hosting Program |
| XX | Application Services | Application Services\|Mainframe Servers\|Mainframe Server |
| XX | Application Services | Application Services\|Misc and Consultative Services |
| XX | Application Services | Application Services\|Misc and Consultative Services\|Global Delivery |
| XX | Application Services | Application Services\|Misc and Consultative Services\|Imaging Services |

1-80 of 80 items     10 | 50 | 100 | 200 | 500 | 2000 | All

| ID | XXXX |
| Product Category | Access Management 1 ▾ |
| Source Category | |
| Name | |

Save | Delete | Clear | Export

UNIFIED PRODUCT CATALOG ORDERS

BACKGROUND

Sophisticated companies often have internal technical support systems for supporting the needs of their employees. When these sophisticated companies merge or undergo restructuring, the systems tend to exist as independent and separate systems. Employees of the merged companies may not be aware of all of the resources available to them or know how to access and use the independent and separate systems. Moreover, the services and goods offered by these disparate systems may overlap creating a waste of resources.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The embodiments are directed to systems for providing a central hub to a user for ordering products from disparate catalog systems. The system includes a computer apparatus including a processor and a memory and a software module stored in the memory, comprising executable instructions that when executed by the processor cause the processor to import catalog data from one or more underlying catalog systems. In some embodiments, the executable instructions further cause the processor to provide a user interface to a user for ordering items from the catalog data. In some embodiments, the executable instructions further cause the processor to configure required fields for order fulfillment for each item. In some embodiments, the executable instructions further cause the processor to receive a request for at least one selected item from the user. In some embodiments, the executable instructions further cause the processor to present at least one required field to the user in response to the request. In some embodiments, the executable instructions further cause the processor to send an order for the at least one selected item to the one or more catalog systems, the order comprising data from the at least one required field.

In additional embodiments, the executable instructions further cause the processor to prompt the user to input information into fields required for the at least one selected item. In some embodiments, the executable instructions further cause the processor to auto-populate the at least one of the required fields. In other embodiments, the executable instructions further cause the processor to set a display order, field data type, and visibility for the required fields. In still other embodiments, the executable instructions further cause the processor to identify fields that are common for the at least one selected item, wherein at least a portion of the identified fields are duplicative and merge the common fields.

In further embodiments, the executable instructions further cause the processor to display the common fields at the top of the user interface and display fields unique to the at least one selected item and that require user input at the bottom of the user interface. In some embodiments, the executable instructions further cause the processor to map a dependent field of the required fields to a parent field such that the dependent field is displayed if preselected data is entered into the parent field. In other embodiments, the executable instructions further cause the processor to map a parent field of the required fields to one or more dependent fields such that the one or more dependent fields are displayed if preselected data is entered into the parent field. In still other embodiments, the executable instructions further cause the processor to search an internal knowledge database for articles related to the at least one selected item and display the most relevant articles to the user. In further embodiments, the order comprises multiple items associated with a single source catalog or multiple source catalogs and/or the order comprises a single item associated with a single source catalog or multiple source catalogs Also provided are embodiments directed to computer program products for providing a central hub to a user for ordering products from disparate catalog systems. The computer program products include a non-transitory computer readable storage medium having computer readable program code embodied therewith, the computer readable program code comprising computer readable program code configured to import catalog data from one or more underlying catalog systems.

In some embodiments, the computer program products further include computer readable program code configured to provide a user interface to a user for ordering items from the catalog data. In some embodiments, the computer program products further include computer readable program code configured to configure required fields for order fulfillment for each item. In some embodiments, the computer program products further include computer readable program code configured to receive a request for at least one selected item from the user. In some embodiments, the computer program products further include computer readable program code configured to present at least one required field to the user in response to the request. In some embodiments, the computer program products further include computer readable program code configured to send an order for the at least one selected item to the one or more catalog systems, the order comprising data from the at least one required field.

In additional embodiments, the computer program products further include computer readable program code configured to prompt the user to input information into fields required for the at least one selected item. In some embodiments, the computer program products further include computer readable program code configured to auto-populate the at least one of the required fields. In other embodiments, the computer program products further include comprising computer readable program code configured to identify fields that are common for the at least one selected item, wherein at least a portion of the identified fields are duplicative; and merge the common fields. In still other embodiments, the computer program products further include computer readable program code configured to display the common fields at the top of the user interface; and display fields unique to the at least one selected item and that require user input at the bottom of the user interface.

Further provided herein are computer-implemented methods for providing a central hub to a user for ordering products from disparate catalog systems. In some embodiments, the methods include importing, by a processor, catalog data from one or more underlying catalog systems. In some embodiments, the methods include providing, by a processor, a user interface to a user for ordering items from the catalog data. In some embodiments, the methods include configuring required fields for order fulfillment for each item. In some embodiments, the methods include receiving a request for at least one selected item from the user. In some embodiments, the methods include presenting, by a processor, at least one required field to the user in response to the request. In some embodiments, the method include sending, by a processor, an order for the at least one selected item to the one or more catalog systems, the order comprising data from the at least one required field.

In further embodiments, the methods include prompting the user to input information into fields required for the at least one selected item. In additional embodiments, the methods include identifying fields that are common for the at least one selected item, wherein at least a portion of the identified fields are duplicative and merging the common fields. In other embodiments, the methods include mapping a dependent field of the required fields to a parent field such that the dependent field is displayed if preselected data is entered into the parent field.

Other aspects and features, as recited by the claims, will become apparent to those skilled in the art upon review of the following non-limited detailed description of the invention in conjunction with the accompanying figures.

BRIEF DESCRIPTION OF THE SEVERAL VIEWS OF THE DRAWINGS

The present embodiments are further described in the detailed description which follows in reference to the noted plurality of drawings by way of non-limiting examples of the present embodiments in which like reference numerals represent similar parts throughout the several views of the drawings and wherein:

FIG. 5 is an exemplary graphical user interface (GUI) of an administrative tool for a unified catalog system in accordance with various embodiments;

FIG. 6 is an exemplary graphical user interface (GUI) of an administrative tool for a unified catalog system in accordance with various embodiments;

FIG. 7 is an exemplary graphical user interface (GUI) of an administrative tool for a unified catalog system in accordance with various embodiments;

FIG. 8 is an exemplary graphical user interface (GUI) of an administrative tool for a unified catalog system in accordance with various embodiments;

FIG. 11 is an exemplary graphical user interface (GUI) of a unified product catalog in accordance with various embodiments.

DETAILED DESCRIPTION

Figure 1:
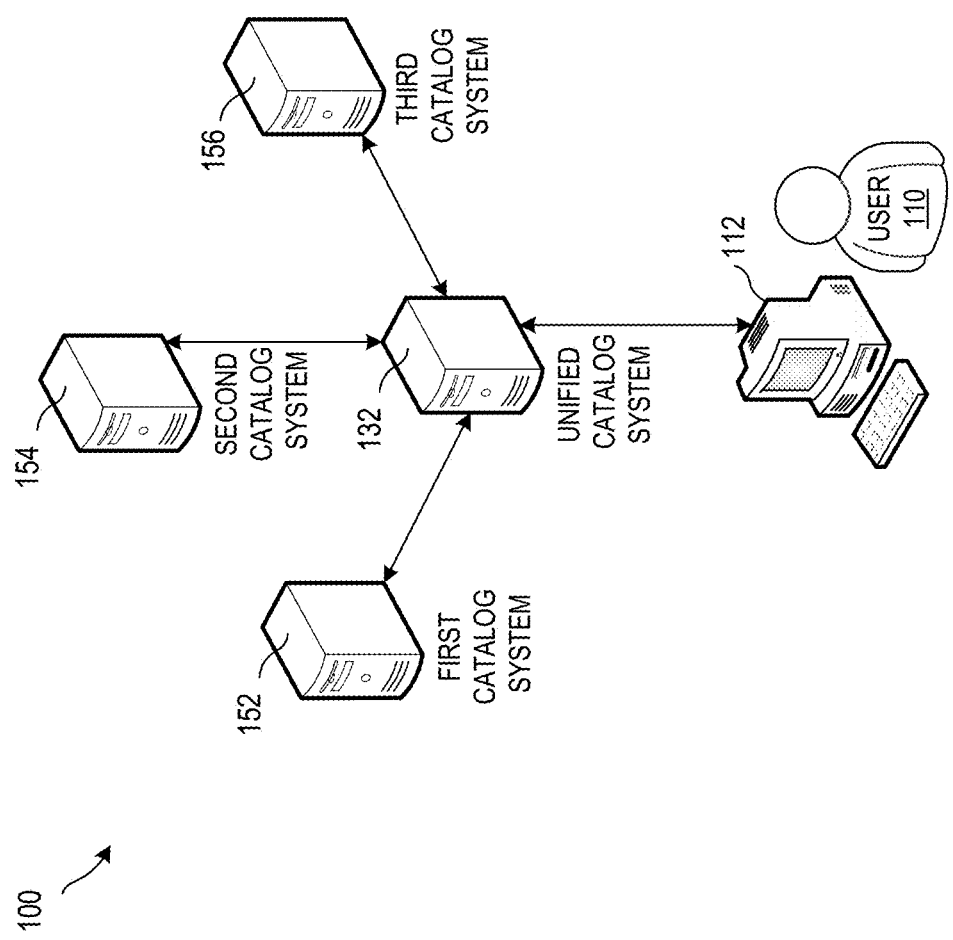
FIG. 1 provides a block diagram illustrating a system and environment for creating and maintaining a unified product catalog in accordance with the embodiments presented herein.

The embodiments presented herein are directed to systems, methods, and computer program products for creating and maintaining a unified product catalog. The embodiments take advantage of existing infrastructure to eliminate the need to reconfigure disparate systems or merge such systems together. The systems and methods retrieve catalog data from independent and separate underlying catalog systems using APIs provided by the catalog systems. The catalog data can be modified and reconfigured to remove product duplicates, suppress overlapping product categories, and enhance order fulfillment. A unified product catalog is provided to the user for browsing and ordering items collected from the underlying catalog systems. The unified product catalog is configured to provide a streamlined service to the user such that the user may be unaware of the various underlying catalog systems that supply the ordered products. In this way, a simplified and cohesive catalog experience is provided to the user.

The embodiments of the disclosure may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present embodiments of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the disclosure are described below with reference to flowchart illustrations and/or block diagrams of methods, apparatus (systems) and computer program products according to embodiments of the embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to the figures, FIG. 1 provides a block diagram illustrating a system and environment 100 for providing unified product catalog. The system 100 includes a user 110, a device 112 of the user 110, a unified catalog system 132, a first catalog system 152, a second catalog system 154, and a third catalog system 156, which are in communication with each other via a network 150 (see, FIG. 2). In some embodiments, the user 110 includes at least one of an individual or entity associated with a catalog system, an employee, a support team member, an agent of the user, and the like. The catalog systems 152, 154, 156 can include underlying systems maintained by, owned, or otherwise associated with a third party, a vendor, and the like that feed into the unified catalog system 132.

The unified catalog system 132 is configured to crawl the catalog systems 152, 154, 156 to retrieve and import catalog data. In some embodiments, the catalog systems 152, 154, 156 provide data retrieval programming (e.g., API's) or other programs to the unified catalog system 132 to enable the data retrieval. The programming can be formatted to certain specifications that are compatible with the unified catalog system 132. The API's act like a contract between the unified catalog system 132 and the underlying catalog systems 152, 154, 156 that allows the unified catalog system 132 to search and import the catalog data in the underlying systems. Once the catalog data has been retrieved and imported, the unified catalog system can maintain and modify the imported catalog data. Although three unified catalog systems (i.e., the first catalog system 152, the second catalog system 154, and the third catalog systems 156) are illustrated in FIG. 1, it will be understood that any number of catalog systems may be used.

In the illustrated embodiment, the unified catalog system 132 provides a unified product catalog to the user's device 112. The user 110 accesses the unified product catalog on the user's device 112 to send data to and receive data from the unified catalog system 132 and/or the catalog systems 152, 154, 156. Similarly, the unified catalog system 132 and the catalog systems 152, 154, 156 can also send data to and receive data from each other or from the user's device 112. The transferred data shared among the systems and devices of FIG. 1 can include catalog data, order data, requests, transaction data or other files, notifications, communications, and the like.

Figure 2:
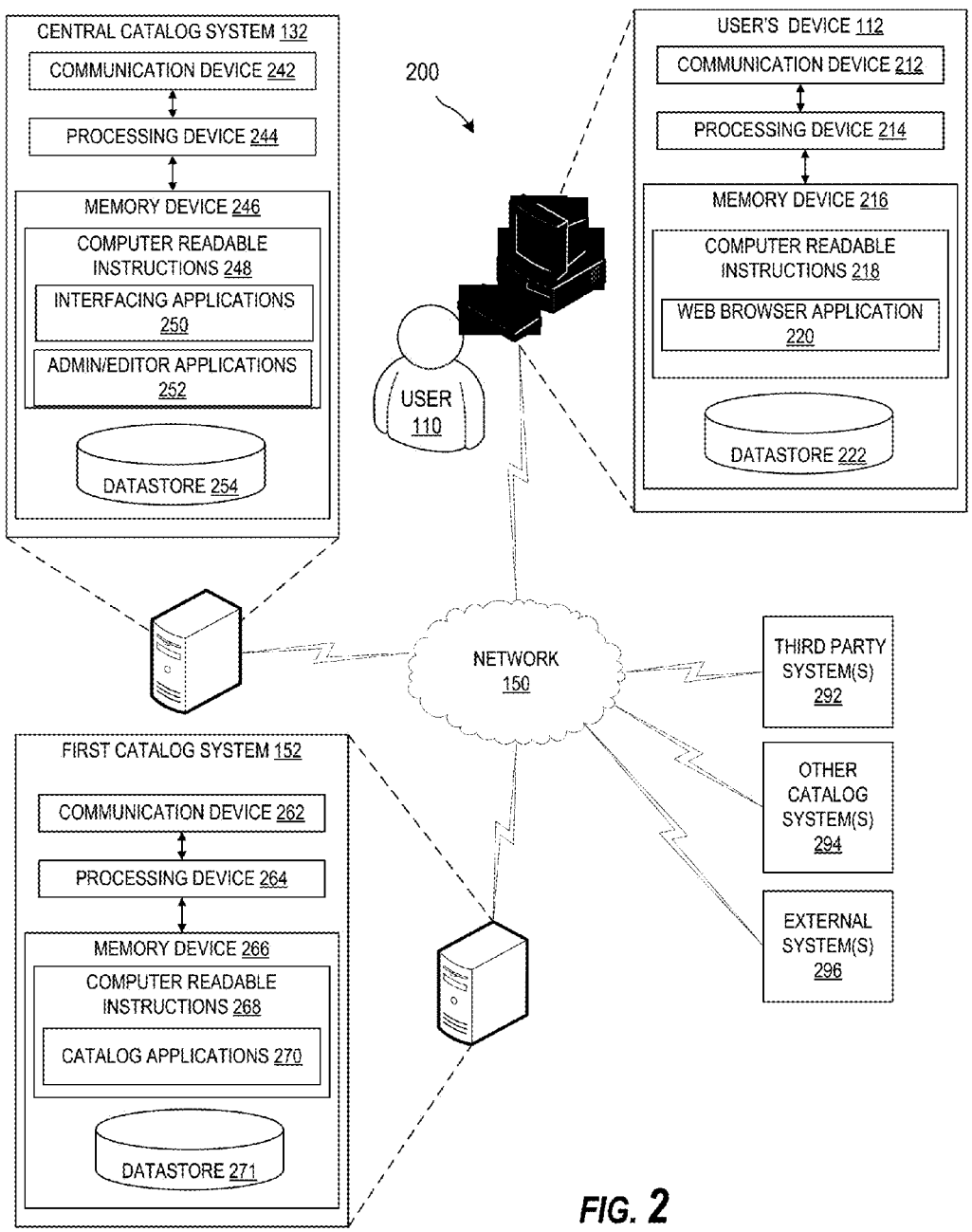
FIG. 2 provides a block diagram illustrating the unified catalog system, the first catalog system, and the user's device of FIG. 1, in accordance with various embodiments.

Referring now to FIG. 2, a block diagram illustrates an environment 200 for creating and maintaining a unified product catalog. The environment 200 includes the user's device 112, the first catalog system 152, and the unified catalog system 132 of FIG. 1. The environment 200 further includes one or more other third party systems 292 (e.g., a partner, agent, or contractor associated with the unified catalog system 132), one or more other catalog systems 294 (e.g. the second catalog system 154 and third catalog system 156), and one or more external systems 296. The systems and devices communicate with one another over the network 150 and perform one or more of the various steps and/or methods according to embodiments of the disclosure discussed herein. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

The user's device 112, the first catalog system 152, and the unified catalog 132 each includes a computer system, server, multiple computer systems and/or servers or the like. The unified catalog system 132, in the embodiments shown has a communication device 242 communicably coupled with a processing device 244, which is also communicably coupled with a memory device 246. The processing device 244 is configured to control the communication device 242 such that the unified catalog system 132 communicates across the network 150 with one or more other systems. The processing device 244 is also configured to access the memory device 246 in order to read the computer readable instructions 248, which in some embodiments includes an interfacing application 250 and administrator and/or editor applications 252. The memory device 246 also includes a datastore 254 or database for storing pieces of data that can be accessed by the processing device 244.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

The user's device 112 includes a communication device 212 and communicably coupled with a processing device 214, which is also communicably coupled with a memory device 216. The processing device 214 is configured to control the communication device 212 such that the user's device 112 communicates across the network 150 with one or more other systems. The processing device 214 is also configured to access the memory device 216 in order to read the computer readable instructions 218, which in some embodiments includes a web browser (or catalog mobile) application 220 for accessing the unified product catalog. The memory device 216 also includes a datastore 222 or database for storing pieces of data that can be accessed by the processing device 214.

The first catalog system 152 includes a communication device 262 communicably coupled with a processing device 264, which is also communicably coupled with a memory device 266. The processing device 264 is configured to control the communication device 262 such that the third party system 152 communicates across the network 150 with one or more other systems. The processing device 264 is also configured to access the memory device 266 in order to read the computer readable instructions 268, which in some embodiments include a catalog application 270. The memory device 266 also includes a datastore 271 or database for storing pieces of data that can be accessed by the processing device 264.

In some embodiments, the web browser application 220 and the catalog application 270 interact with the interfacing application 250 and administrator and editor applications 252 to receive or provide catalog data; send formatting instructions; provide API's, order statuses, notifications, confirmations, and transaction data; analyze transaction data; process orders; and the like.

The applications 220, 250, 252, and 270 are for instructing the processing devices 214, 244 and 264 to perform various steps of the methods discussed herein, and/or other steps and/or similar steps. In various embodiments, one or more of the applications 220, 250, 252, and 270 are included in the computer readable instructions stored in a memory device of one or more systems or devices other than the systems 152 and 132 and the user's capture device 112. For example, in some embodiments, the application 220 is stored and configured for being accessed by a processing device of one or more third party systems 292 connected to the network 150. In various embodiments, the applications 220, 250, 252, and 270 stored and executed by different systems/devices are different. In some embodiments, the applications 220, 250, 252, and 270 stored and executed by different systems may be similar and may be configured to communicate with one another, and in some embodiments, the applications 220, 250, 252, and 270 may be considered to be working together as a singular application despite being stored and executed on different systems.

In various embodiments, one of the systems discussed above, such as the unified catalog system 132, is more than one system and the various components of the system are not collocated, and in various embodiments, there are multiple components performing the functions indicated herein as a single device. For example, in one embodiment, multiple processing devices perform the functions of the processing device 244 of the unified catalog system 132 described herein. In various embodiments, the unified catalog system 132 includes one or more of the external systems 296 and/or any other system or component used in conjunction with or to perform any of the method steps discussed herein. For example, the unified catalog system 132 may include a financial institution system, an information technology system, and the like.

In various embodiments, the unified catalog system 132, the first catalog system 152, and the user's device 112 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 300, the other methods discussed below, or other methods, processes or steps discussed herein or not discussed herein.

The embodiments are directed to creating, maintaining, and managing a unified catalog system. As a result of mergers, acquisitions, expansions, and changing needs, a single company may have several independent and disparate catalog systems for ordering products. Employees who may need items such as goods or services, may have to search around to identify the disparate systems, and may be required to visit several catalog systems in order to obtain the items they need.

The unified catalog system provides an interface for communication with a user that sets forth a unified interface for providing goods and services to the user. It unifies and collapses the underlying catalog systems into a single central system so that a user can visit a single source in order to find and order items. The system pools and presents items from all of the underlying catalog systems, and reaches out to the underlying systems to fulfill item requests. The user may not even be aware of the underlying systems as they browse the unified catalog system. In this way, a unified catalog system can be created without completely overhauling and restructuring the existing systems.

To establish a bridge to the unified catalog system, disconnected catalog systems can be required to submit one or more application programming interfaces (APIs) in a preselected format. The APIs are written to expose data using a standard data interchange mechanism such as SML, representational state transfer (REST), and the like. The APIs are required to perform certain functions such as crawling of the catalog, ordering items, changing an order, and checking order status. An administrator of the unified catalog system can integrate the disconnected catalog system into the unified catalog system using the formatted APIs provided by the disconnected catalog system. The pre-formatted APIs provided by the various disparate systems ensures that the integration is a smooth and efficient process.

Figure 3:
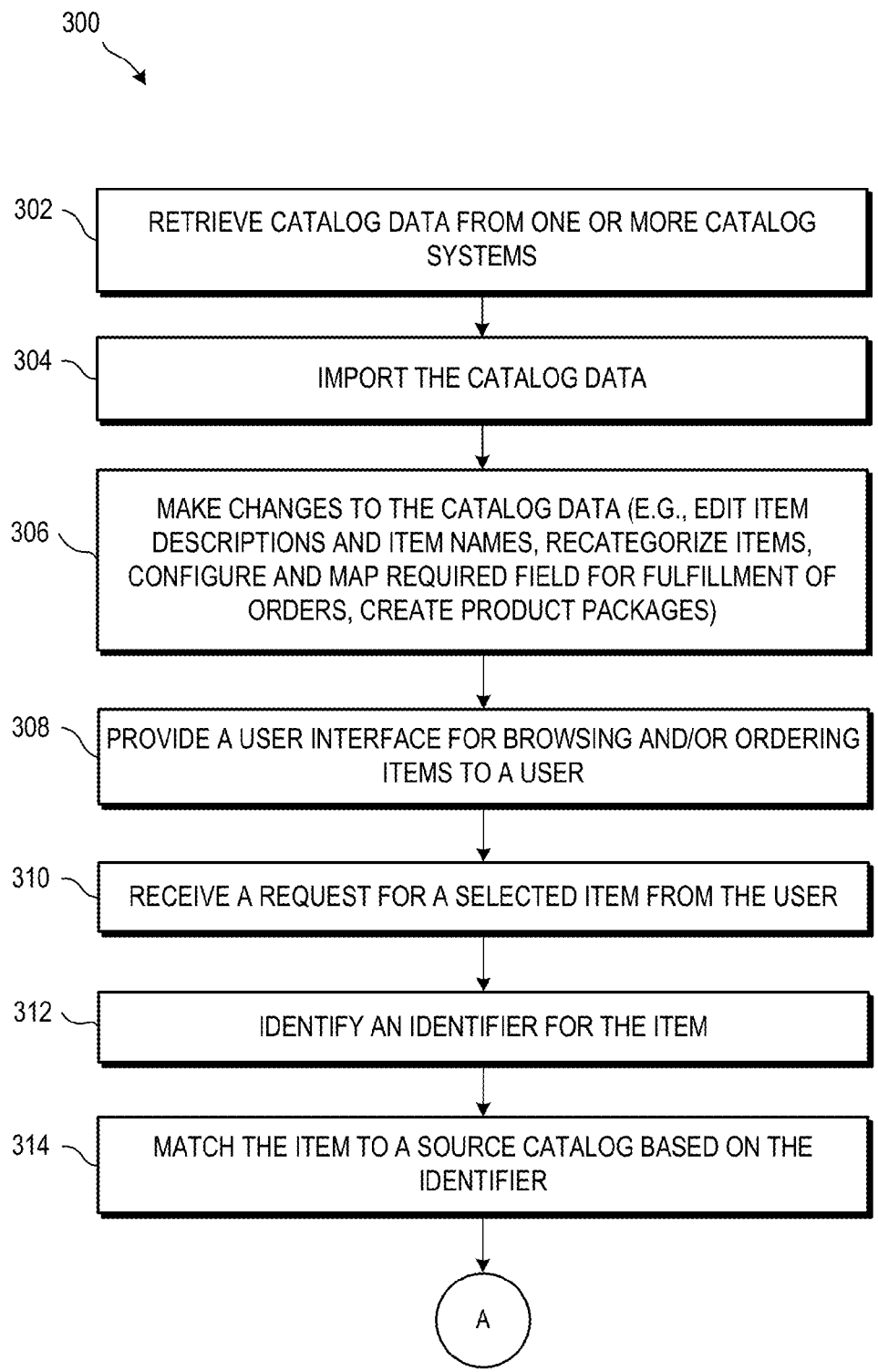
FIG. 3 is a flowchart illustrating a system and method for creating and maintaining a unified product catalog in accordance with various embodiments.

FIG. 3 illustrates a flowchart providing an overview of a process 300 for providing and maintaining a unified product catalog. One or more devices, such as the one or more computing devices and/or one or more other computing devices and/or servers of FIG. 1 and FIG. 2, can be configured to perform one or more steps of the process 300 described below. In some embodiments, the one or more devices performing the steps are associated with a financial institution. In other embodiments, the one or more devices performing the steps are associated with a merchant, business, partner, third party, credit agency, account holder, and/or user.

As illustrated at block 302, catalog data from one or more catalog systems is retrieved. The catalog data includes item identifiers, item descriptions, categories, mapping configurations, system requirements, order fulfillment information, and the like. In some embodiments, a "crawl" API or other data retrieval tool is used to identify and retrieve catalog data as described herein above.

As illustrated at block 304, the catalog data is imported into a unified catalog system or other system of process 300. The unified catalog system serves as a central hub for the one or more catalog systems and provides the unified product catalog system to the user. The one or more catalog systems are disparate and independent underlying systems that feed into the unified catalog system. The catalog data may be imported into the unified catalog system in any way. For example, an administrator of the unified catalog system may simply copy and paste REST APIs (e.g., API's in the form of URLs) to import the catalog data.

As illustrated at block 306, changes are made to the catalog data. In some embodiments, items descriptions, item names, item images, prices, identifiers, and the like are modified, deleted, added, reformatted, or otherwise edited. In some embodiments, an administrator associated with the system is granted permission to make the modifications. For example, the system of process 300 may assign roles to individuals based on a role based administrative function. This role based assignment allows certain individuals to edit certain types of data. Some editing tasks, for example, may require that some items such as new products use hard code to make modification to the data. In such cases, only certain individuals who have the capacity, authority, and/or expertise will be granted permission to implement changes for new products or other types of data.

Figure 5:
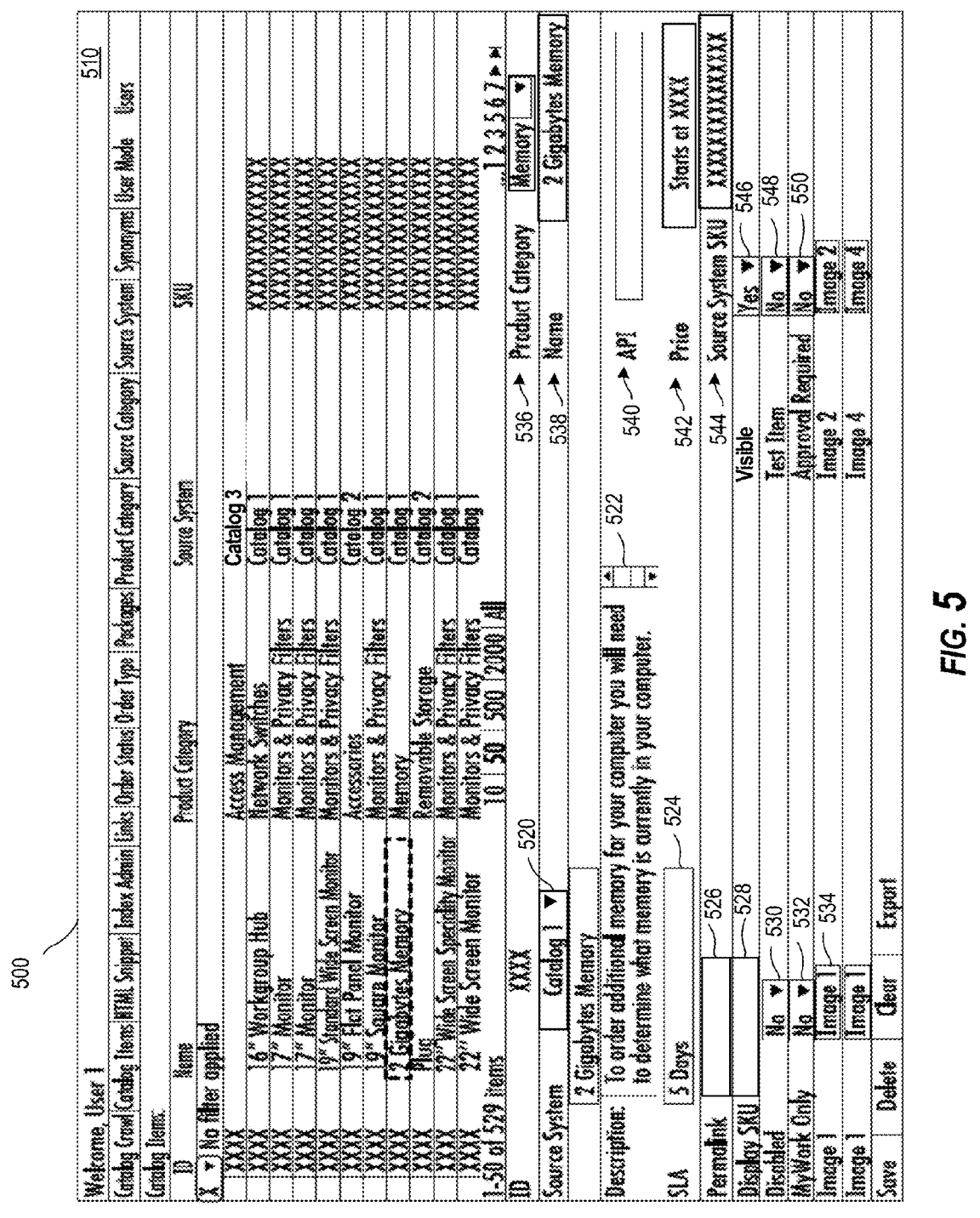

FIG. 5 illustrates a GUI 500 of an administrative catalog item tool 510 that is accessible by an administrator for editing the catalog data and maintaining individual catalog items. The GUI 500 includes various tabs positioned near the top of the screen for catalog crawling, HTML snippet tools, index administration tasks, order status, order types, creating item packages, editing and reviewing source category mapping (see, e.g., FIG. 7), source systems, synonyms configurations (see, FIG. 6), user modes, and users. In the illustrated embodiment, the "Catalog Items" tab is selected.

The catalog item tool 510 presents a table that includes various information related to a particular catalog item including item IDs (e.g., an internal numeric code used by the unified catalog system), item names, product category for each item, source systems, and the stock keeping unit (SKU) for each item. As shown in FIG. 5, the administrator has selected the "2 Gigabytes Memory" item to edit. If more than one source system supplies the selected item, the administrator may select the source system used to fulfill the item using a drop down box 520 for source systems. In some embodiments, the administrator may select more than one source system or create priority rules for determining which system fulfills a particular item. For example, the system may implement priority rules to determine rating assignments to rank the most preferred order fulfillment system. The system with the most expertise and resources for printing services, for example, may receive the highest priority and deemed the preferred system. The ratings may also be based on historical performance such as whether a particular system met SLA deadlines in the past six months, user satisfaction surveys, order frequency, and the like. The priority ratings may be based on an item-by-item basis or based on an order-by-order basis. For example, order may have include a single item associated with a single or multiple catalog systems or the order may include multiple items associated with a single catalog system or multiple catalog systems. In situations where the highest ranked or most preferred system cannot fulfill an order due to item backorders, backlogs, low resources, technical issues, and the like, the order data may be sent to the second highest ranked in the second preferred system. In other cases, the system of process 30 may simply identify the system that has the ordered item in stock and that can fulfill the order within the SLA time frame. In other embodiments, the administrator may add, remove, or adjust new systems via a system table (not shown). Such changes may occur before the underlying source system is crawled to retrieve data. For example, if a new system is to be associated with the unified product catalog, an administrator may delete an old system or simply add the new system as a source system before catalog data is retrieved for the newly added system.

Also provided by the catalog item tool 510 is a description box 522 that allows the administrator to modify the description for the selected item. The administrator may edit the item description for a particular item to update product information, make corrections, provide more or less details, and the like. The administrator can position a cursor within the description box to add and/or delete text. SLA box 524 presents the current service level agreement terms that define how long it will take for the system to fulfill the order, which may be increased or decreased by the administrator. In some cases, the SLA can be increased or decreased automatically or manually based on input from the one or more catalog systems, the season, historical performance trends, the number of pending orders, catalog user traffic, and the like. The administrator may also include, remove, or modify permalinks and display SKUs in permalinks box 526 and display SKUs box 528, respectively.

Further provided in GUI 500 is a disabled box 530 for indicating whether the selected item should be disabled in the unified catalog system, a group box 532 for determining if the product should be limited to a particular group for ordering (e.g., employees enrolled in the "MyWork" program), and one or more image boxes 534 for selecting or changing the images displayed to the user in the unified product catalog. An item can be disabled if the system determines that it has an "unorderable" status. For example, the item may be discontinued, unavailable, outdated, or incompatible with other items in the order. Further, the one or more catalog systems that fulfill the item may prefer that the item be ordered directly and not through the unified product catalog. Labor intense products, complicated items, time or security sensitive items, and items that must be tracked may be better serviced and fulfilled directly from the one or more source catalogs.

Referring again to FIG. 5, a product category box 536 is shown that allows the administrator to change, delete, or include additional product categories that the selected item will be associated in. The selected item may be included in one product category or multiple categories. A name box 538 allows the administrator to modify the name of the product (or not) by positioning the cursor in the name box 538 and modifying the text therein. The administrator can input, delete, or modify an API for the selected item in the API box 540. Further, the administrator can also modify the listed price or source system SKU in the price box 542 and the SKU box 544, respectively. The visible box 546, the test item box 548, and the approval required box 550 allows the user to change the status for each box (i.e., yes or no) if needed.

Referring now to FIG. 6, a GUI 600 of a synonyms maintenance table 610 is illustrated and provides a way to associate multiple additional words or phrases with a particular catalog item. An administrator may access the synonyms maintenance table 610 by selecting the "Synonyms" tab shown in GUI 500 of FIG. 5. The maintenance table 610 includes a list of item identifiers, the associated name of the catalog item, and the synonym value for each item. In the illustrated embodiment, the administrator has selected "Item 6" and has assigned a synonym of "Software 1." The table 610 lists several different items that have been associated with the synonym of Software 1 such that any search-hit on the synonym or an item name assigned to that synonym will be treated as a positive hit for those particular items. Other items such as Items 13-15 are associated with the same software synonym and the remaining times have also been associated with various other synonyms. The administrator can use the synonym maintenance table 610 to modify the synonym associations with various items to create the optimal searching experience for the user in the unified product catalog.

In further embodiments, the system of process 300 is configured to re-categorize items. FIG. 7 illustrates a GUI 700 featuring a source category mapping tool 710. The mapping tool 700 enables an administrator to map the categories in the underlying catalog systems to the high level product categories of the unified catalog system. In the illustrated embodiments, a variety of "Application Services" categories and sub-categories in an underlying catalog are being mapped to the high-level "Application Services" category of the unified catalog system.

Figure 8:
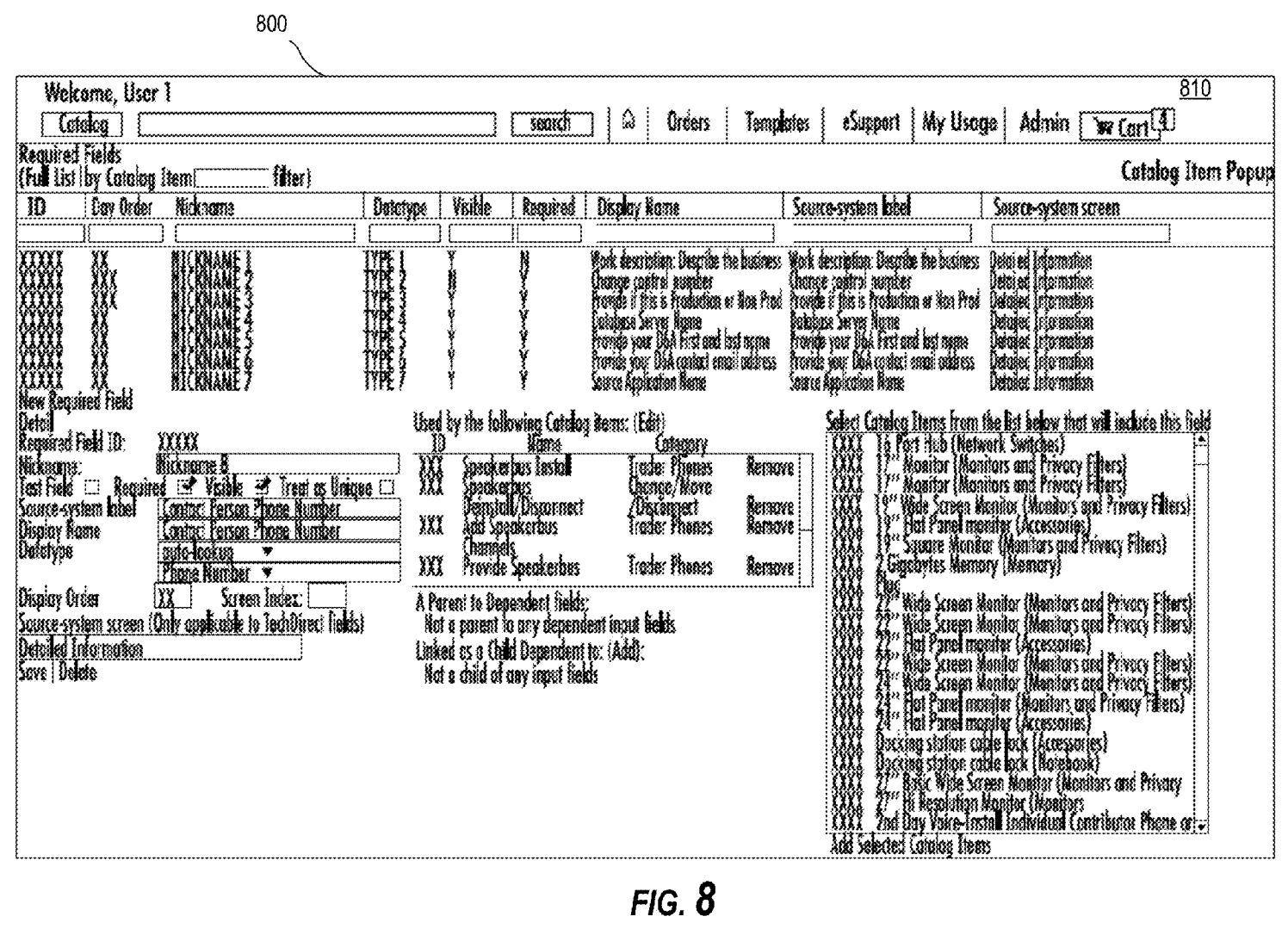

In further embodiments, required fields for the fulfillment of orders are configured and mapped. FIG. 8 illustrates a GUI 800 of a required field tool 810, which allows an administrator to configure the information needs that are required to be obtained from a user for each catalog item to fulfill an order. The administrator can filter the list of required fields to a specific catalog item and search for fields meeting certain criteria (e.g., all field containing the label "telephone").

As shown in the illustrated embodiment, there are a number of details for a new required field that can be set from the GUI 800 including the display order, field data type, whether or not the particular field is required, customized drop-down values, and the like. A "progressive disclosure" relationship can be set up where a specific answer to one question may cause additional questions to be displayed and so forth. The administrator can used the required field tool 810 to edit which catalog items use a particular required field, link the required field as a parent to dependent fields inputted or selected by the administrator, or link the required field as a child dependent field to fields the administrator selects. Further, the administrator can select particular items from a list that will be included in the new required field illustrated in FIG. 8.

As discussed in more detail below, the system of process 300 can configure the required fields such that the same question is never asked twice. For example, if the user is asked for name and telephone number for one order or for one item in an order, the system will automatically use that information for placing and fulfilling other items in the order or other orders. Further, the system can also auto-populate fields based on data extracted from a user's employee number, login information, saved template, previous order, stored data, and the like.

In other cases, the tool 810 has an option to treat a particular field as unique to override the process for avoiding repetition of questions. For example, the system may prompt the user to answer the same question multiple times. If a user is ordering 3 copies of a specific software product, it may be determined that the software products are being ordered on behalf of other users. In such cases, the user is asked to input the intended recipient for each copy.

In further embodiments, the system of process 300 creates a product package. The system identified related items from the catalog data such as products associated with a particular product category, items needed by a certain group of people (e.g., new employees), items associated with a brand or manufacturer, and the like. The related items can then be linked to generate a product package that can be presented to the user via the unified product catalog.

Figure 9:
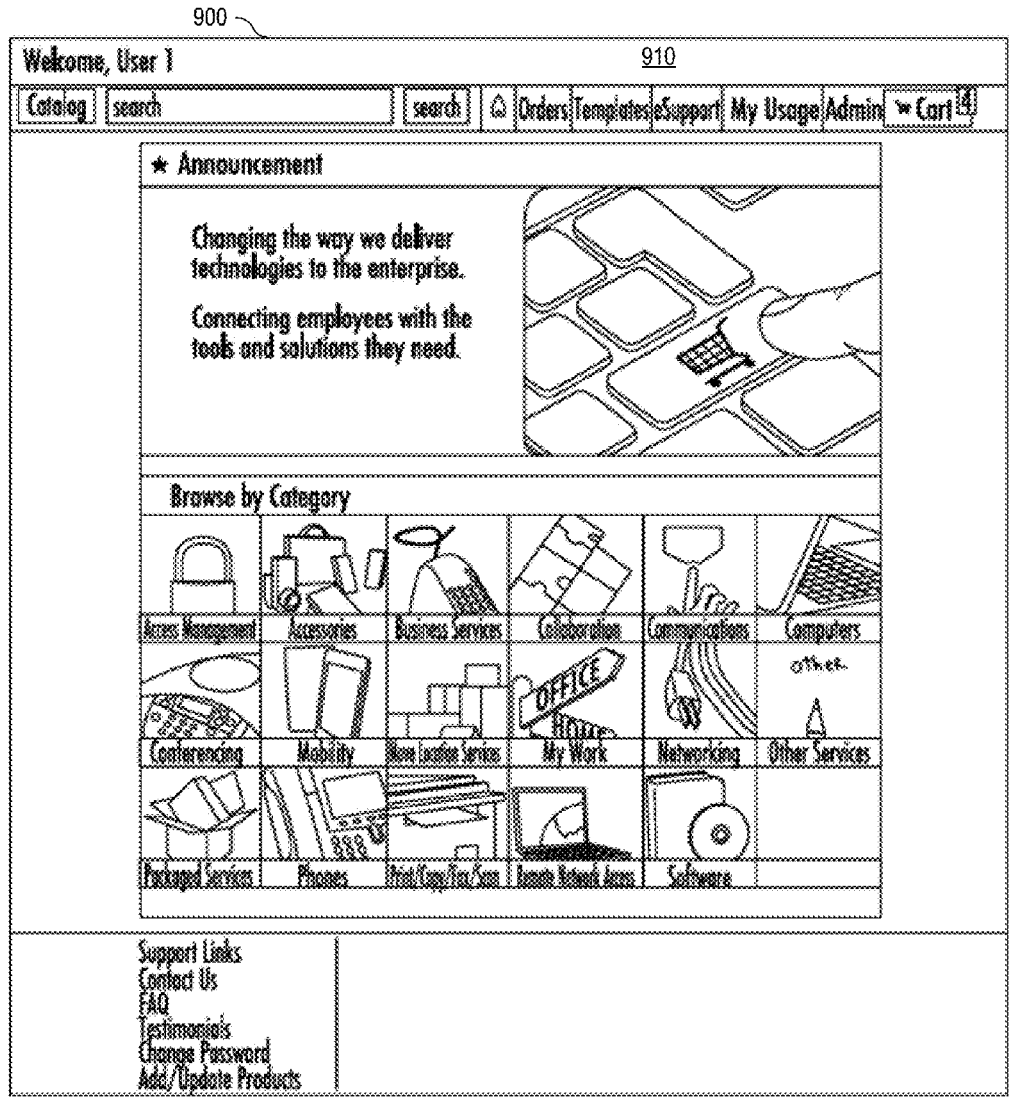
FIG. 9 is an exemplary graphical user interface (GUI) of a unified product catalog in accordance with various embodiments.

Returning now to FIG. 3, a user interface for browsing and/or ordering items from unified catalog system is provided to a user as illustrated at block 308. FIG. 9 illustrates a GUI 900 of a homepage 910 of the unified product catalog. The user may be required to log into the catalog by inputting a user name, employee ID, password, biometric data, or other security information to log into the unified product catalog. The homepage 910 includes a search tool for finding specific items using keyword or product ID. Additionally, the homepage 910 includes certain product categories for the user to browse. The product categories include access management, accessories, business services, collaboration, and so forth. To track orders, view or save templates, contact customer service, track previous order, change ordering or personal information, the user can select the requisite tabs near the top of the homepage 910.

As illustrated at block 310 of FIG. 3, a request for a selected item is received from the user. For example, the user may select a product from the categories or from a list generated by a keyword search in the unified product catalog. If the item is determined to be orderable, it is placed in the user's shopping cart.

As illustrated at block 312, an identifier of the item is identified. The item identifier comprises code, text, number, and/or symbols that enable the system of process 300 to identify and fulfill an order. In some embodiments, the identifier or product code displayed to the user is the same or different than the item identifier. For example, the product code displayed on the online product catalog may be an internal identifier used by the unified catalog system to keep track of items, and/or an SKU. The internal identifier or SKU may be different from the SKU in the unified catalog system. The item identifier, for example, may be the SKU or other code associated with the one or more catalog systems providing the item, and different from the displayed product code, or the displayed product code and the item identifier may be the same. In some cases, an internal code may be displayed if there is more than one SKU or catalog system associated with the selected item. The internal code can be used to identify all items associated with that internal code.

As illustrated at block 314, the item is matched to a source catalog based on the identifier. The one or more catalog systems manage, own, or are otherwise associated with the source catalog. The source catalog is the catalog that provides, maintains, and/or fulfills the matched item or orders for the matched item.

In further embodiments, duplicate items are identified based on the item identifier. SKUs, for example, can be used to identify multiple items that are supplied and serviced by multiple catalog systems. In such cases, at least a portion of the duplicate are removed such that only item is displayed to the user and not several copies of the exact same item. Some or all of the duplicates can also be removed or suppressed based on priority rules that govern which catalog systems is the preferred systems for supplying the items. The items associated with the preferred catalog systems may be retained and all other duplicate items can be removed. In other cases, the duplicate items associated with the non-preferred catalog systems may be retained in storage so that the system can identify the systems that supply the particular item should the preferred system be incapable of fulfilling an order.

Figure 4:
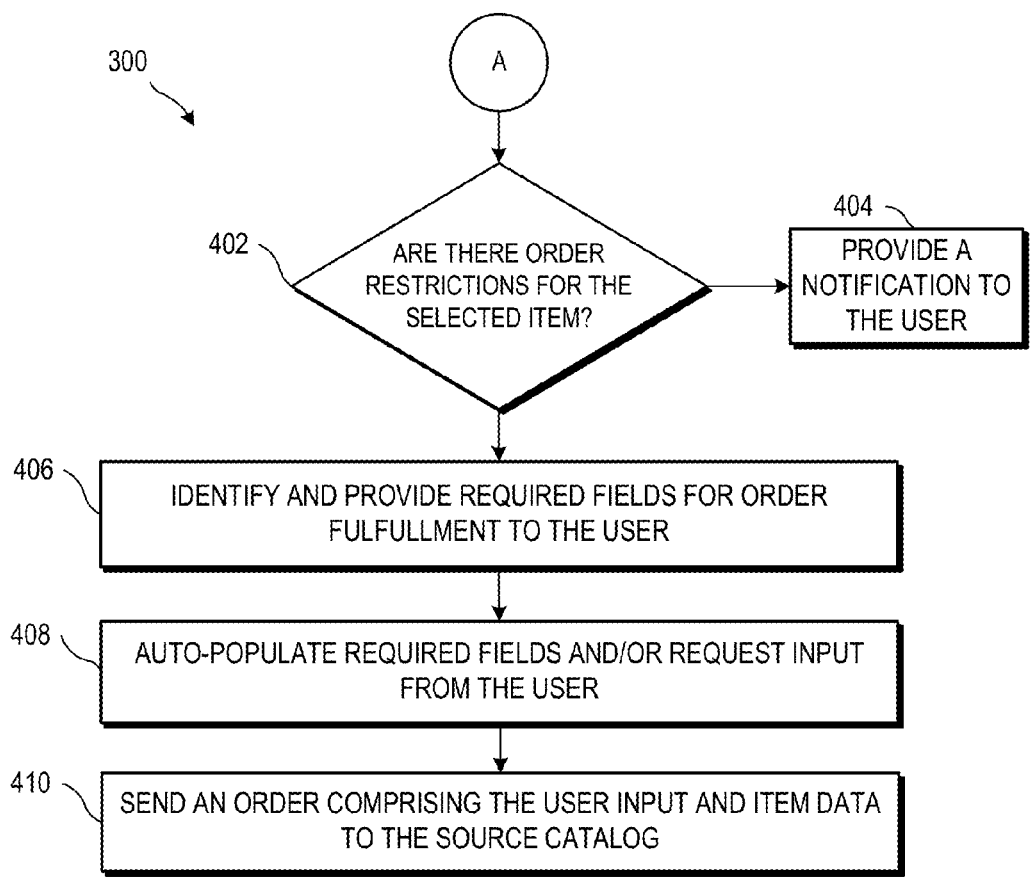
FIG. 4 is a flowchart illustrating a system and method for creating and maintaining a unified product catalog in accordance with various embodiments.

Referring now to FIG. 4, the process 300 is further illustrated. As illustrated at decision block 402, the system of process 300 determines if there are order restrictions for the selected item. The order restrictions include rules that determine whether an item is orderable. The rules can be based on delay times, item quantity maximums, SLA periods, stock quantity, the identity of the fulfilling catalog system, and so forth. Some items may be deemed orderable or unorderable based on any number of factors including item popularity, frequency an item is ordered, reported glitches or issues with an item, fluctuations in production, item discontinuations, items costs, amount of support needed for an item, user reviews, and the like. In some cases, unorderable items will not appear on the unified product catalog or the user may not be able to select the item for ordering (e.g., the item may be greyed out). In other cases, the orderability status of the item may change such that the user may be able to view and select an item, but may not be able to order the item from the unified product catalog.

As illustrated at block 404, a notification is provided to the user if order restrictions are detected. In cases where the item cannot be ordered due to the orderability status associated with the selected item, the notification can include the orderability status, reasons for the orderability status, suggestions for similar items, and the like. For example, if there is a backlog, logistical issues, or stocking issues associated with the selected item, the notification may include the expected amount of delay to fulfill the item, the reason for the delay, alternative items, and/or alternative channels for ordering the selected item. In still other embodiments, the notification includes a link for the underlying catalog system associated with the selected item. For example, some items may only be ordered directly from the source catalog and cannot be ordered from the unified product catalog.

Figure 10:
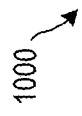
FIG. 10 is an exemplary graphical user interface (GUI) of a unified product catalog in accordance with various embodiments.

As illustrated at block 406, required fields for order fulfillment are identified and provided to the user. FIG. 10 illustrates a GUI 1000 of an order 1010. In the illustrated embodiment, the user has selected four items that appear in the user's shopping cart. The order 1010 includes a picture of each item, the name and quantity of each item, the designated source catalog system for each item, the SLA number, and the cost. The system of process 300 allows the user to change the quantity of each item. Even in cases where the underlying system that has been designated to fulfill the item does not allow more than 1 item to be ordered at a time, the unified product catalog can allow the user to order more than the underlying catalog system's maximum quantity. This is because the system of process 300 may can simply use an order API to call the underlying system any number of times in order to fulfill the quantity requested by the user. Further, the system can also set minimum or maximum quantities for items independent of the underlying systems. For example, the system may require that 3 ink cartridges be ordered at a time in order to save on shipping costs regardless of the minimum quantities set for ink cartridges by the one or more catalog systems.

Returning now to FIG. 10, on the side portion of the GUI 1000, order information detailing required data needed at checkout is provided. This portion of the GUI 1000 allows the user to change order recipients or conduct a test checkout. The test checkout allows the user to screen what information will be required of them during checkout. The GUI 1000 also illustrates a "Save as Template" option which allows the user to save the order as a template to use for future orders with or without completing the checkout process. The saved template can be used to automatically populate the user's cart in the future before the user checkouts. The user may also add new items and checkout using the save template, or the user can add new items and save the new cart (saved template+new items) as a new template. If a user chooses to add an order template to the cart when there are existing items in the cart, the user will be prompted to clear the cart first or to merge the template with the cart. If they chose the merge option, any duplicate items can be automatically removed so that overlapping items are not double-added. In other cases, the system determines that duplicates exist in the shopping cart, and then prompts the user to answer whether or not the user intended to increase the quantity of the duplicate item. If the user only intended to order one mouse, for example, the user may decrease the quantity of mice to one. The required fields, in some embodiments, are provided to the user during checkout as discussed in more detail below with regard to FIG. 11.

Figure 11:
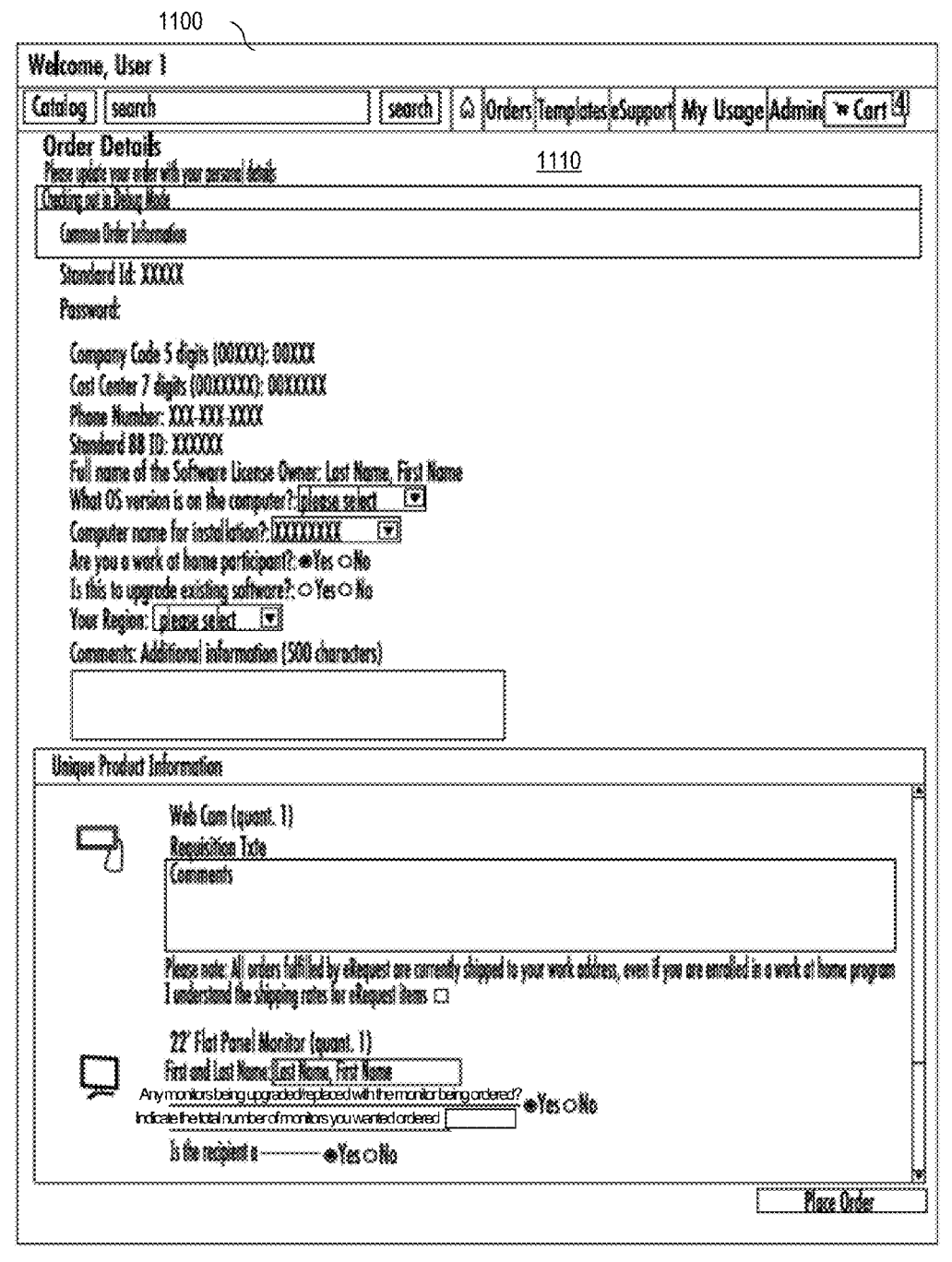

Returning now to FIG. 4, required fields are auto-populated and/or input from the user is requested as illustrated at block 408. In some embodiments, the required fields are auto-populated based on internal default information databases. For example, the system of process 300 may have access to a wide variety of information for each user and may not require the user to input information (e.g., computer identifiers, phone, address, cost center, and so forth) contained in other databases that accessible to the system. FIG. 11 provides a GUI 1100 that includes the required fields in an order details page 1110. The user can access the order details page 1110 by selecting the "Proceed to checkout" button on the GUI 1000 of FIG. 10. Because the cart from the order 1010 includes two software products, the exact same required fields are needed to complete the order for these items. This common information is auto-populated at the top of the GUI 1100. For example, phone number, cost center, and company code fields are auto-populated based on the user's login information, employee number, previous orders, and the like. This prevents the user from having to answer the same question twice. Some required fields in the common information top portion may not be auto-populated (e.g., password and region) and require user input.

Further provided in the order details page 1110 is a unique product information portion positioned beneath the common order information portion. For this particular order displayed in FIG. 11, the web cam and monitor each have additional required fields that require the user to answer questions or input additional information. Once the user has completed entering information in the required fields, the user can select the button at the bottom of the GUI 1100 to place the order.

Returning now to FIG. 4, order data comprising the user input and item data is sent to the source catalog for order fulfillment and processing as illustrated at block 410. A single order may have multiple items from the same or different sources. In some embodiments, a single item is associated with multiple source catalogs. For example, a software program may be in three underlying source catalogs. In such cases, the system of process 300 follows priority fulfillment rules as discussed above. The source catalog receives the order data and fulfills the order within the SLA and other order parameters. The user may track the progress of the order fulfillment via the unified product catalog.

In some embodiments, a refusal of at least a portion of the order is received from the source catalog. For example, the source catalog may have a backlog of orders and may not be able to meet the order SLA. In other examples, the source catalog may not have the selected item in stock. In such cases, the system of process 300 follows order parameters and rules. The order parameters can include a fulfillment priority such that a second source catalog fulfills the order when the first source catalog cannot. In other cases, the order may be fulfilled using a third party source (e.g., an outside vendor) if the items relate to security, are time sensitive, are critical to the user's work production, and the like. In still other cases, the system provides the user with a notification if there will be a delay in the fulfillment of the order, or if a portion of the order cannot be fulfilled.

Figure 12:
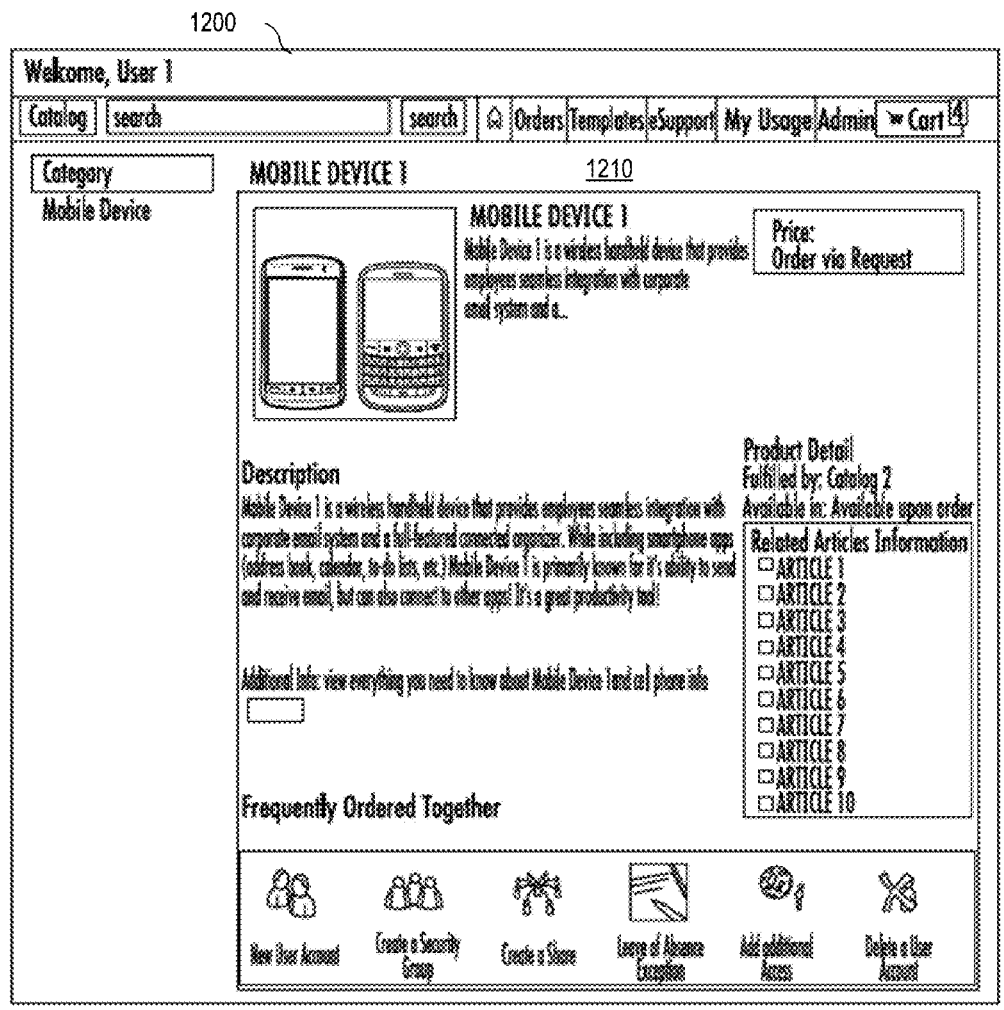
FIG. 12 is an exemplary graphical user interface (GUI) of a unified product catalog in accordance with various embodiments.

FIG. 12 is a GUI 1200 of product detail page 1210. In some embodiments, the product detail page 1210 may be provided to the user while browsing and placing an order, or before placing an order. In the illustrated embodiment, a mobile device description page of a particular mobile device in a mobile device category is provided to the user. Near the top of the page, an image of the mobile device 1, the price, and a brief product description are provided. Below the top portion are a more complete description of the mobile device 1 and a section listing and providing links to articles associated with mobile device 1 or mobile devices in general. In some embodiments, the articles or other additional data is retrieved from external systems. In particular embodiments, the articles are identified by passing the item name into an internal knowledge based search engine. In the illustrated embodiments, the first 10 hits from the engine search are displayed. Further included in the product detail page 1210 is a frequently order together section, which displays items that have been included in past order associated with the mobile device 1.

In some embodiments, administrators have permission to select an edit button (not shown) on the product detail page 1210. In this way, product description can be dynamically edited on the product detail page 1210 instead of using a dedicated maintenance screen.

Further illustrated in FIG. 12, is a "Frequently Order Together" section near the bottom of the GUI 1200. Frequently ordered items or popular items are calculated by the system based on the information supplied by the unified product catalog. This is advantageous because the frequent items are determined based on all of the ordering data from the one or more catalogs and not just one underlying catalog system.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or teams thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the disclosure in the form disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated. Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. This application is intended to cover any adaptations or variations of the present disclosure. The following claims are in no way intended to limit the scope of embodiments of the disclosure to the specific embodiments described herein.

What is claimed is:

1. A unified catalog system for providing a central hub to a user for ordering products from disparate catalog systems, the system comprising:
   a computer apparatus including a processor and a memory; and
   a software module stored in the memory, comprising executable instructions that when executed by the processor cause the processor to:
   send data retrieval format requirements to two or more underlying catalog systems;
   receive an application programming interface from the two or more underlying catalog systems;
   determine that the application programming interface is compliant with the data retrieval format requirements;
   import catalog data from the two or more underlying catalog systems into a unified catalog system using the application programming interface, wherein the two or more underlying catalog systems are disparate and independent catalog systems associated with a single entity;
   identify items from the catalog data;
   provide a user interface to a user for ordering the identified items from the catalog data;
   configure required fields for order fulfillment for each item of the items from the catalog data;
   receive, from the user, a request for at least one selected item from the items in the unified catalog system;
   present at least one of the configured required fields to the user in response to the request for the at least one selected item; and
   send an order for the at least one selected item to the unified catalog system, the order comprising the at least one of the configured required fields.

2. The system of claim 1, wherein the executable instructions further cause the processor to:
   auto-populate the at least one of the configured required fields.

3. The system of claim 1, wherein the executable instructions further cause the processor to:
   set a display order, field data type, and visibility for the configured required fields.

4. The system of claim 1, wherein the executable instructions further cause the processor to:
   identify common fields of the configured required fields for the at least one selected item, wherein at least a portion of the identified common fields are duplicative; and
   merge the identified common fields.

5. The system of claim 4, wherein the executable instructions further cause the processor to:
   display the identified common fields at a top of the user interface; and
   display configured required fields unique to the at least one selected item and that require user input at a bottom of the user interface.

6. The system of claim 1, wherein the executable instructions further cause the processor to:
   map a dependent field of the configured required fields to a parent field of the configured required fields such that the dependent field is displayed if preselected data is entered into the parent field.

7. The system of claim 1, wherein the executable instructions further cause the processor to:
   map a parent field of the configured required fields to one or more dependent fields of the configured required fields such that the one or more dependent fields are displayed if preselected data is entered into the parent field.

8. A computer program product providing a central hub to a user for ordering products from disparate catalog systems, the computer program product comprising:
   a non-transitory computer readable storage medium having computer readable program code embodied therewith, the computer readable program code comprising:
   computer readable program code configured to send data retrieval format requirements to two or more underlying catalog systems;
   computer readable program code configured to receive an application programming interface from the two or more underlying catalog systems;
   computer readable program code configured to determine that the application programming interface is compliant with the data retrieval format requirements;
   computer readable program code configured to import catalog data from the two or more underlying catalog systems into a unified catalog system using the application programming interface, wherein the two or more underlying catalog systems are disparate and independent catalog systems associated with a single entity;
   computer readable program code configured to identify items from the catalog data;
   computer readable program code configured to provide a user interface to a user for ordering the identified items from the catalog data;
   computer readable program code configured to configure required fields for order fulfillment for each item of the items from the catalog data;
   computer readable program code configured to receive, from the user, a request for at least one selected item from the items in the unified catalog system;
   computer readable program code configured to present at least one of the configured required fields to the user in response to the request for the at least one selected item; and
   computer readable program code configured to send an order for the at least one selected item to the unified catalog system, the order comprising the at least one of the configured required fields.

9. The computer program product of claim 8, further comprising computer readable program code configured to auto-populate the at least one of the configured required fields.

10. The computer program product of claim 8, further comprising computer readable program code configured to identify common fields for the at least one selected item, wherein at least a portion of the identified common fields are duplicative; and merge the identified common fields.

11. The computer program product of claim 10, further comprising computer readable program code configured to display the identified common fields at a top of the user interface; and display configured required fields unique to the at least one selected item and that require user input at a bottom of the user interface.

12. The computer program product of claim 8, wherein the computer readable program code comprising:

computer readable program code configured to map a dependent field of the configured required fields to a parent field of the configured required fields such that the dependent field is displayed if preselected data is entered into the parent field.

13. A computer-implemented method for providing a central hub to a user for ordering products from disparate catalog systems, the method comprising:

sending, by a processor, data retrieval format requirements to two or more underlying catalog systems;

receiving, by a processor, an application programming interface from the two or more underlying catalog systems;

determining, by a processor, that the application programming interface is compliant with the data retrieval format requirements;

importing, by a processor, catalog data from the two or more underlying catalog systems into a unified catalog system using the application programming interface, wherein the two or more underlying catalog systems are disparate and independent catalog systems associated with a single entity;

providing, by a processor, a user interface to a user for ordering the identified items from the catalog data;

configuring, by a processor, required fields for order fulfillment for each item of the items from the catalog data;

receiving, by a processor, from a user, a request for at least one selected item from the items in the unified catalog system;

presenting, by a processor, at least one of the configured required fields to the user in response to the request for the at least one selected item; and sending, by a processor, an order for the at least one selected item to the unified catalog system, the order comprising the at least one of the configured required fields.

14. The computer-implemented method of claim 13, further comprising:

identifying, by a processor, common fields for the at least one selected item, wherein at least a portion of the identified common fields are duplicative; and merging, by a processor, the identified common fields.

15. The computer-implemented method of claim 13, further comprising:

mapping a dependent field of the configured required fields to a parent field of the configured required fields such that the dependent field is displayed if preselected data is entered into the parent field.

16. The computer-implemented method of claim 13, wherein the computer-implemented method further comprises:

auto-populating, by a processor, the at least one of the configured required fields.

17. The computer-implemented method of claim 13, wherein the computer-implemented method further comprises:

mapping, by a processor, a parent field of the configured required fields to one or more dependent fields of the configured required fields such that the one or more dependent fields are displayed if preselected data is entered into the parent field.

* * * * *